United States Patent [19]
Kehoe, deceased et al.

[11] 3,739,915
[45] June 19, 1973

[54] INTERNAL PRESSURE PRECOAT FILTER

[75] Inventors: Edward C. Kehoe, deceased, late of Essex County, N.J.; Jean West Kehoe, executrix, 11 Hillcrest Place, North Caldwell, N.J.

[73] Assignee: Johns-Manville Products Corporation, New York, N.Y.

[22] Filed: Oct. 2, 1970

[21] Appl. No.: 77,569

[52] U.S. Cl. ............... 210/394, 210/397, 210/399, 210/415
[51] Int. Cl. .......................................... B01d 33/02
[58] Field of Search ............... 210/75, 77, 79, 394, 210/396, 397, 399, 403, 405, 413-415

[56] References Cited
UNITED STATES PATENTS

| | | | |
|---|---|---|---|
| 742,971 | 11/1903 | Cummer | 210/415 X |
| 1,382,056 | 6/1921 | Bontemps | 210/414 X |
| 1,750,764 | 3/1930 | Schaefer | 210/415 X |
| 2,181,404 | 11/1939 | Koppitz et al. | 210/415 X |
| 420,148 | 1/1890 | Dunn et al. | 210/394 |
| 1,604,649 | 10/1926 | Manning | 210/75 X |
| 2,125,532 | 8/1938 | Wells | 210/414 |

*Primary Examiner*—John Adee
*Attorney*—John A. McKinney and Robert M. Krone

[57] ABSTRACT

In a preferred embodiment, a rotary filter or dewatering device having a conical shape in which the precoat is on the inside of the conical filter, and in which pressure within the cone and/or vacuum on the outside surface of the conical filter creates a differential pressure causing a feed within the conical filter to be filtered through the filter, and the filtrate to be collected outside of the conical filter. A revolving knife having a spiral contour and being concentric to the conical filter, fractionally advances axially into the conical filter at a predetermined rate to cut away a surface layer of the precoat, the spiral contour serving also to force the sludge of filtered solids to an outlet from said conical filter. The invention also includes the process of precoating, filtering under a differential pressure, and cutting away the precoat from within the conical filter.

6 Claims, 5 Drawing Figures

PATENTED JUN 19 1973  3,739,915
SHEET 1 OF 3
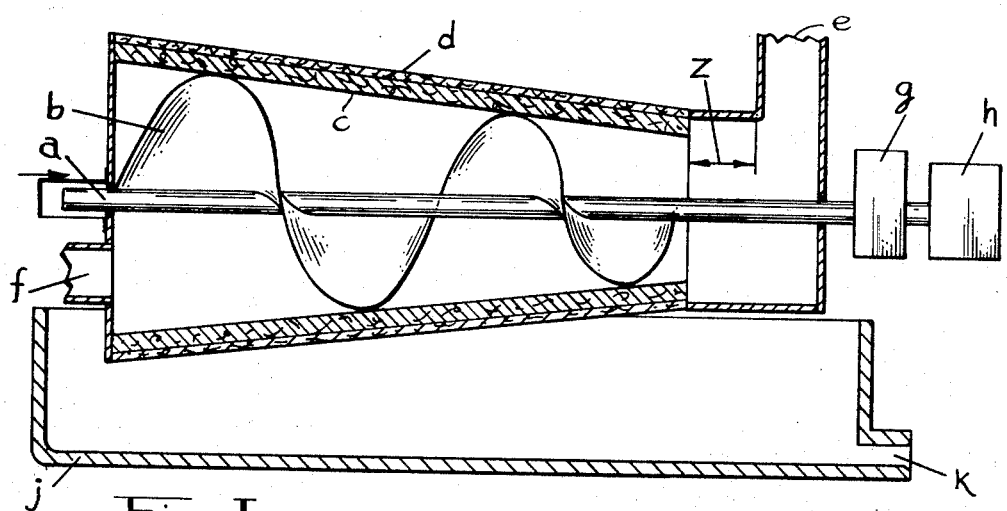
Fig. I.
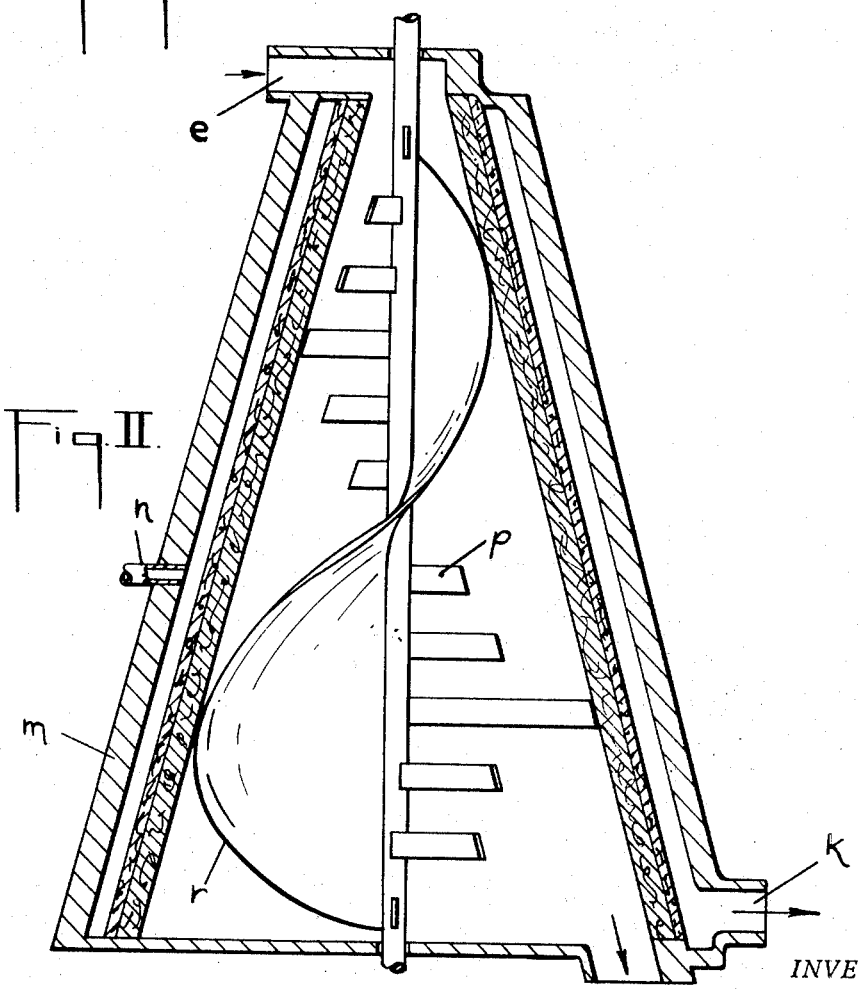
Fig. II.
INVENTOR.
EDWARD C. KEHOE, DECEASED,
BY JEAN WEST KEHOE, EXECUTRIX,
BY John A. McKinney
ATTORNEY

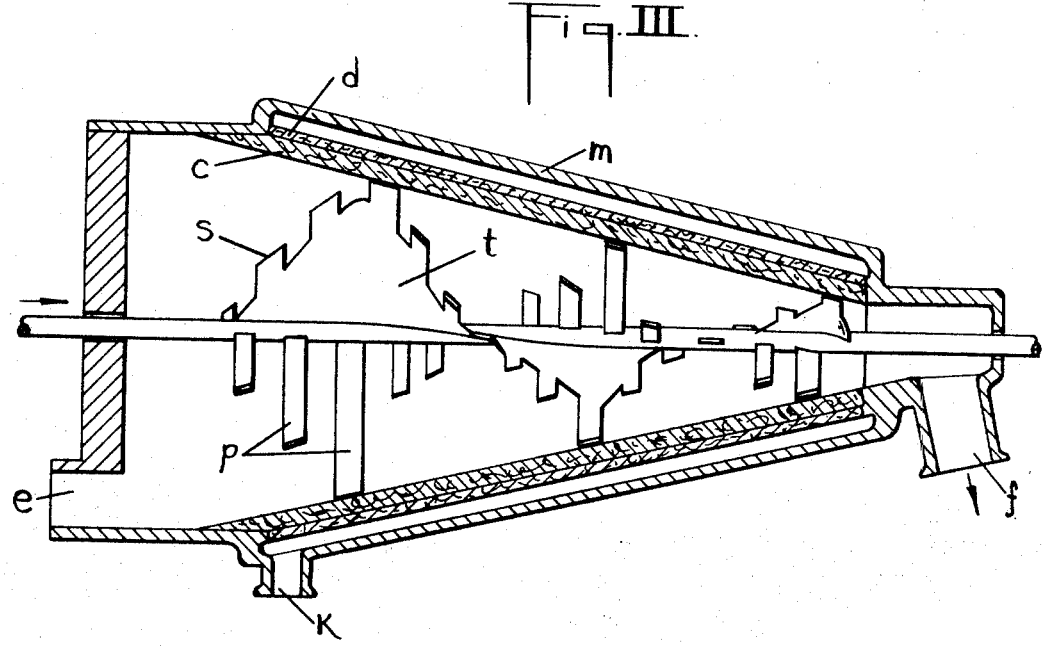
Fig. III.
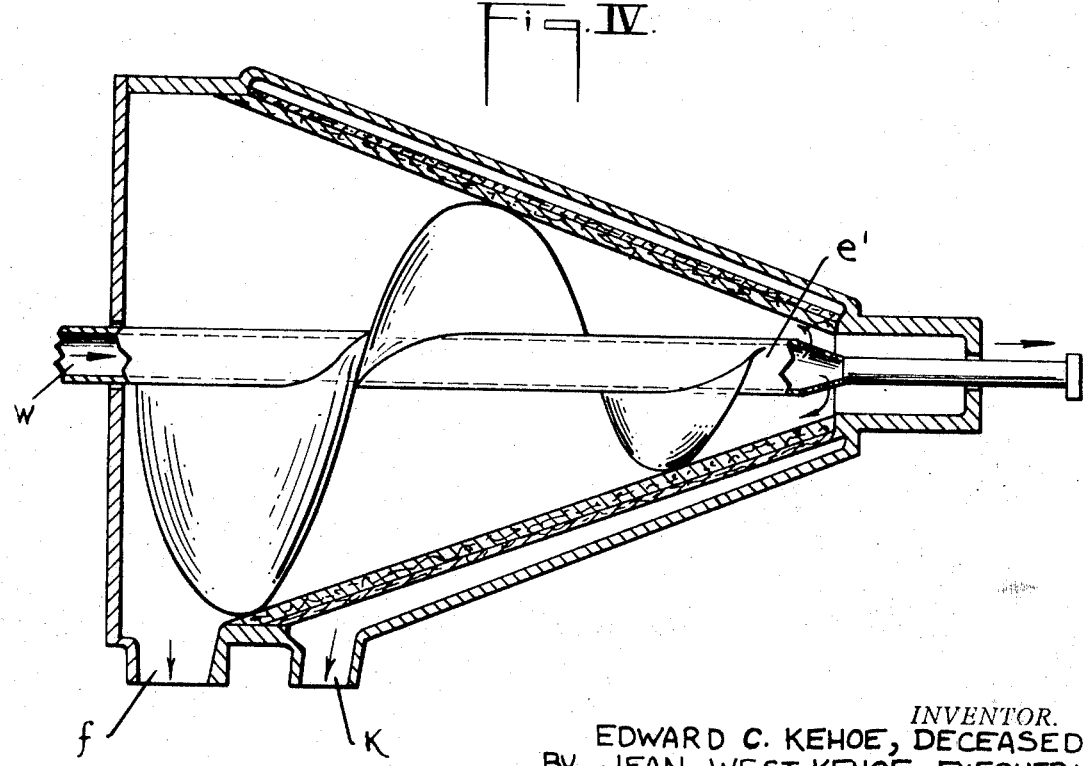
Fig. IV.
INVENTOR.
EDWARD C. KEHOE, DECEASED,
BY JEAN WEST KEHOE, EXECUTRIX,

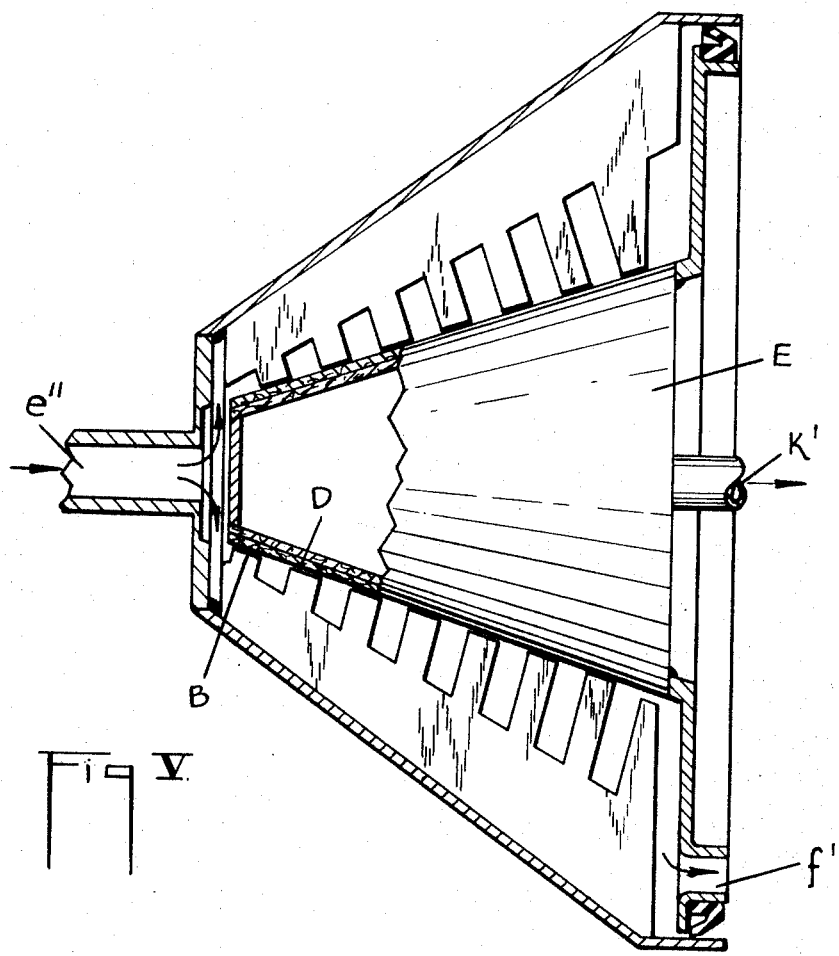

INTERNAL PRESSURE PRECOAT FILTER

This invention is directed to an improved rotary filter or dewatering device as compared to the conventional type of rotary vacuum filters.

BACKGROUND

Prior to this invention conventional rotary vacuum filters were constructed in the form of a rotary drum in which the filter revolved about the axis of the drum, and in which a precoat was placed on the outside of the filter with a cutting means to gradually cut away surface layers of the precoat as the precoat became impregnated and clogged by filtered solids (sludge). In these conventional vacuum filters, a differential pressure was placed across the filter whereby the half of the filter drum submerged within the slurry to be filtered had a vacuum applied within the drum to draw filtrate through the filter into the drum. Because of the size of these filters, and the vessel in which the drum is half-submerged, it was not practical to apply a positive pressure on the slurry to be filtered. Also, in these conventional filters, solely about half of the drum is submerged within the vessel, whereby solely about 180 degrees of the drum is effectively filtering at any one time. Typical of conventional rotary vacuum filters are those described for example in U.S. Pat. Nos. 2,083,887, and 2,265,386.

THE OBJECTS

An object of this invention is a rotary filter or dewatering device which may employ either or both positive pressure and vacuum.

Another object of this invention is a rotary filter or dewatering device which effectively employs about a 360° filtering cycle.

Another object is a process in which a positive pressure is applied across a precoated filter or dewatering device of the rotary type.

Another object is a process for obtaining about a 360° filtering cycle employing a rotary type filter or dewatering device.

Another object is a rotary type filter having an improved means for cutting-off a layer of the precoat filter and for removing the cut-off layer.

Other objects become apparent from the preceding and following disclosure.

The objects of this invention are obtained by a novel rotary filter and novel process. The rotary filter has a filter of a conical shape with an opening at one or more ends of the cone, preferably at both ends, a means for imparting a precoat of a filter aid to the surface of the filter inside of the cone, a means for imparting a differential pressure across the surface of the filter, with a greater pressure on the inside of the cone than on the outside of the cone whereby filtrate passes from a feed slurry within the cone through the filter aid and filter and is collected outside of the conical filter. The rotary filter also includes a removable spiral cutting means having a conical contour that substantially conforms to the inside surface of the conical filter and being substantially concentric to the conical filter, and includes a means for imparting a revolving motion of at least one to the other of the conical filter and the cutting means, around the common axis to the conical filter and the conical cutting means. In the rotary filter of this invention, as in all rotary filters employing precoating on the filter, as filtration proceeds, the surface layer of the precoating becomes less permeable as a result of clogging by the filtered solids (sludge) whereby a cutting means is necessary for removing a thin surface layer of the clogged precoat filter aid. Accordingly, for the apparatus of this invention, the spiral conical cutting means includes an additional means for advancing the cutting means axially along the axis common to both the conical filter and the cutting means, whereby as the conical cutting means fractionally advances further within the conical filter, the cutting means bites into the precoat filter to remove a surface layer thereof. As in the conventional rotary filters, the cutting means is preferably such that it advances merely fractionally and substantially continuously as filtration proceeds.

The cutting means rotates in a direction whereby the spiral walls thereof serve to extrude the cut-off precoat filter and the filtered solids, through an outlet from the passage within the conical filter, the outlet preferably being at substantially the end of the spiral cutting means. The sludge outlet may be provided with sufficient back-pressure to preclude a substantial loss of feed slurry and/or liquid (such as water) through the sludge outlet.

The feed solids may be introduced directly into an open end of the conical filter into the passage formed by the conical filter, or alternatively, the feed to be filtered may be introduced through a tube extending through the axis around which the cutting means revolves. Such a tube may have multiple openings along the revolvable axis, or alternatively may have merely one opening at the opposite end of the axis tube through which the feed enters. Preferably the outlet through which the cut-off precoat filter and filtered solids are to be extruded is located at an end of the apparatus substantially opposite to the end having an inlet into the main passage of the conical filter for the feed, whereby the feed to be filtered is required to pass at least substantially the entire length of the conical tube prior to extrusion of the cut-off filter aid and filtered solids. Thereby there is a greater opportunity for the filtrate to be filtered from the feed slurry and accordingly less filtrate will be extruded with the filtered solids.

Various representative and typical embodiments of the apparatus of this invention are illustrated in each of FIGS. I through IV.

FIG. I graphically illustrates an embodiment of simple structure, including a cam or slide drive designated $g$ whereby the cutting means may be caused to move further into the conical filter. The rotary drive means is designated $h$.

In each of FIGS. I through IV, a feed slurry is introduced through an inlet $e$ into the main passage within the conical filter in which the spiral cutting means $b$ is located on an advanceable shaft $a$. The cutting means $b$ (for example, of FIG. I) cuts away a thin surface layer of the precoat filter aid $c$ coated on the filter $d$. The cut-away filter aid, and the filtered solids embedded therein, are extruded by the cutting means $b$ through the sludge outlet $f$. The filtrate passes through the precoat filter aid $c$ and the filter $d$ to be collected in filtrate collection vessels $j$ and $m$, typically with an outlet $k$.

In FIG. I, $z$ indicates the approximate distance that the cutting means can advance within the conical filter, whereby the cutting means is able to gradually cut away a substantial part of the precoat filter.

FIG. II additionally illustrates a different type of collection vessel m which is enclosed and is adapted to have a vacuum connection n on the top side of the collection vessel whereby a vacuum may be placed on the collection vessel enclosure but whereby concurrently the filtrate drains from the filtrate outlet k. However, it is possible, either alternatively or additionally, to have a vacuum connection connected to the filtrate outlet k. Also FIG. II illustrates a cutting means which has both cutting blades p mounted separately and a continuous spiral blade r which serves predominantly as a scraper to remove clinging particles and miscellaneous matter remaining after the cutting-off of a thin surface layer by the series of blades p each having cutting edges adjacent to the precoat filter aid, the cutting blades in this particular embodiment also being arranged in a spiral relationship and substantially opposite the scraping edge.

FIG. III illustrates an embodiment in which the feed-slurry inlet and the sludge outlet are at ends opposite the location illustrated in each of FIGS. I and II. Also the cutting means illustrated in FIG. III illustrates an embodiment in which the spiral cutting means includes a solid wall t for a part of the distance from the axis to the cutting edge s but which additionally terminates in several separate cutting edges on respectively separate blades with spaces therebetween; in addition, the separate cutting blades p are included. The solid wall t serves to facilitate extrusion of the solids through the outlet f.

FIG. IV illustrates an embodiment in which the feed slurry is fed through the axis passage w of the cutting means through outlet e' into the conical passage of the conical filter.

FIG. V illustrates an alternative embodiment of this invention in which the rotating cylinder through which the feed slurry is fed is the outer cylinder A having the two sets of spiral blades B acting to fractionally cut away the precoat coated on the outer filter surface D of an inner cylinder E into which the filtrate is forced by pressure inside the outer cylinder A. Feed-slurry enters through e' and the sludge exits through outlet f'. Filtrate exits through outlet k'.

The invention also includes the process in which the above-described apparatus is employed. The process includes precoating an inner surface of a rotary pressure filter according to that described above to form a filter precoat, passing under a differential pressure across the filter a fluid medium or slurry to be filtered (normally a water slurry) which is being fed from an inlet into the passage within the conical filter, the feed slurry being fed through at least one open end of the passage. The differential pressure across the filter is such that the pressure on the inside of the cones, i.e. on the inner surface of the filter, is at least greater than the pressure on the outside of the cone, i.e. the outer surface of the cone, thereby causing filtrate to be extracted from within the cone through the filter to the outside surface of the cone where the filtrate is collected. A relative rotary movement of one to the other of the conical filter and the conical cutting means inserted therein is caused to take place whereby the cutting means cuts off the surface layer of the filter precoat. Preferably, the conical filter is stationary and the cutting means revolves within the conical filter around an axis common to both the conical filter and the conical cutting means.

As the filtration or dewatering proceeds, the cutting means is fractionally advanced, preferably continuously, further into the conical filter whereby the leading cutting edges of the cutting means bites into additional surface layers of the precoat filter. In other words, the cutting means moves axially along the axis common to both the cutting means and the conical filter, thereby substantially advancing the cutting means against the filter precoat sufficiently to cut off the surface layer of the precoat.

Although it is not necessary that the cutting edges be arranged in a spiral relationship, it is preferred that there be a spiral continuous or discontinuous wall of one sort or another which serves to move the cut-off surface layer and sludge embodied therein toward an outlet for the sludge and cut-off surface layer. However, it is necessary that the cutting edges be a spiral continuous or discontinuous wall of one sort or another which serves to move the cut-off surface layer and sludge embodied therein away from the filtering precoat surface. The sludge and removed precoat will move toward the outlet end of the unit by virtue of the existent pressure drop. This movement may be and is preferably aided by the direction of rotation of the helix although in certain applications it may be more suitable for the helix to rotate opposite to the direction which drives the sludge forward. This wall may be continuous such as that illustrated in FIG. I by d, as illustrated in FIG. II by r as a continuous wall, or p as a discontinuous wall, or as that illustrated in FIG. III having discontinuous cutting edges s and blades p as well as a solid wall t. Another typical embodiment within the scope of this invention would be an embodiment in which discontinuous blades are on opposite sides of the axis in a spaced relationship, the blade on one side of the axis being opposite the space on the opposite side of the axis; such an embodiment would somewhat resemble that illustrated in FIG. III except that it would not necessarily include the continuous wall t. The advantages of having such discontinuous blades spaced so that at least the spaces are subsequently promptly subjected to a cutting action, is that in the absence of either a continuous blade, or a discontinuous offset blade of this nature, spaces would be left uncut of the precoat filter aid for varying periods of time during which the axis would be advancing into the conical filter.

The spiral cutting means may be typically revolved in a direction whereby the sludge is forced toward the sludge outlet from the passage within the conical filter, although this is not necessarily a requirement of the system because the differential pressure existing between the inlet and the outlet will cause movement of the sludge toward the outlet. Also, in embodiments such as illustrated in FIGS. I–IV, the vacuum and/or pressure facilitates the movement of the sludge.

In the apparatus of this invention, the screw can be of various pitches and forms or even just a "doctor blade" run axially to do the skinning. When the blades have been advanced all the way into the conical filter sufficiently that all the precoat is cut off, the cutting blade and/or cutting means is returned to its beginning position, either during the precoating, of removed before and reset after the filter is again precoated. The migration distance of liquid through the sludge may be modified by the size of the shaft which drives the helix cutting means. If the size of the shaft is almost as big as the helix cutting means, there will be a shorter migration distance and larger filter surface per volume of contained sludge.

As noted above, the helix cutting means may be both a scraper and a cutter with cutting edges adjacent the outer edge of the helix which would be in contact with the precoat filter aid. Alternatively or additionally, as noted above, the helix may be merely a scraper and separate from cutting edges on cutting blades.

Movement of the sludge toward the discharge opening will be facilitated by a pressure drop in that direction. However, as noted above, the helix also aids in the movement of the sludge toward the sludge outlet. As noted above, the helix does not have to be a solid wall, but alternatively may be a thin blade on helically arranged spokes or discs with holes and/or spaces therebetween to allow the sludge to move through, for example.

A primary advantage of this invention is that higher pressures may be employed for filtration in the use of filter aids than normal to conventional vacuum-type filters which are limited to less than atmospheric pressure. Such a problem is common to sewage sludges which require further dewatering for disposal or incineration.

The speed at which the rotating cutting means revolves in the conical filter may be adjusted to the particular situation. For example, the rotating cutting means would be normally rotated at a slower speed when filtering a thick slurry as compared to a thin slurry of solids to be filtered.

Similarly, the speed at which the cutting means axially advances into the passage within the conical filter may be adjusted to a rate at which the precoat filter requires removal because of becoming clogged by impregnating solids. In the apparatus and process of this invention, it is indeed within the scope of the invention to employ any suitable and/or conventional filter and any suitable and/or conventional filter aid, for example to obtain a precoat filter layer. For example, precoat filter aid such as diatomaceous earth, kieselguhr, perlite, and the like are contemplated. The precoat may be placed on the filter prior to the beginning of the filtration, or alternatively the precoat filter aid may be added in the form of a substantially homogeneous mixture with the feed slurry to be filtered whereby the precoat is continuously and continually built-up in thickness as the operation proceeds. In such a latter alternative embodiment, it would not be necessary for the cutting means to advance axially into the conical filter in view of the fact that a revolving cutting means in a stationary position would continually cut away impregnated filter aid as it built up.

The term "feed slurry" as used herein, includes typically a suspension of solids in a liquid such as water, or a solution. The apparatus and method of this invention is applicable to slurries in which the particle size of the solids typically ranges from about 5 microns or slightly smaller to larger than 200 microns. Normally, the solids content may range up to slightly more than 50 percent.

The apparatus and method of this invention are applicable to any continuous method of vacuum and/or pressure filtration, as opposed to batch-type filters such as plate and frame filter presses.

Also, the apparatus of this invention typically of the type illustrated in FIGS. I through IV, may be operated at any desired angle of the concentric filtering means and cutting means. For example, the cone may be either upright or on its side.

The apparatus and process of this invention also can be employed in a large range of applications. For example, the apparatus and process are applicable to the separation of phosphoric acid from slurries of calcium sulfate and phosphoric acid formed by digesting phosphate rock with sulfuric acid in wet-process phosphoric acid manufacture, the production of sodium carbonate, separation of calcium carbonate precipitated in the manufacture of caustic soda by the lime-soda ash process, recovery of salt, sugar, pigments such as lithopone, food products, petroleum products, paper pulp, fibrous asbestos materials, and other materials, or treatment, dewatering, and the like.

The preceding disclosure is intended solely to illustrate the invention and is not intended to unduly limit the scope of the invention except to the extent expressly stated and to the extent that the appended claims are limited. Accordingly, it is within the scope of this invention to use such equivalents and substitutes as would be obvious to a person of ordinary skill in the art.

What I claim is:

1. A rotary filter assembly, comprising: a hollow conically-shaped filter having an inlet opening and an outlet opening; an elongated cutting member operably positioned concentrically within said filter and including a spiral cutting edge tapering radially outwardly along the length of said cutting member parallel with and at substantially the same tapering rate as the inner wall of said conically-shaped filter, said cutting edge extending radially outwardly a sufficient distance so that all portions thereof are in substantial engagement with the inner wall of said filter when said cutting member is in said operable position, means for providing relative rotational movement between said filter and said cutting member about a common axis extending along the axis of said filter; means for providing an axial displacement of said spiral cutting edge relative to said filter from said operable position towards the smaller end of said filter; and means for producing a greater pressure within said filter than on the outside thereof.

2. A rotary filter assembly according to claim 1 wherein said elongated cutting member includes a shaft supporting said cutting edge along a predetermined portion of said shaft and a plurality of discrete cutting edges connected with and extending outwardly from said shaft along said predetermined portion thereof.

3. A rotary filter assembly according to claim 1 wherein the cutting edge of said cutting member includes a plurality of discrete cutting edges extending therefrom.

4. A rotary filter assembly according to claim 1 wherein said outlet includes a valve for exerting back pressure.

5. A rotary filter assembly according to claim 1 including a hollow shaft extending concentrically through said filter and having an entrance opening and an exit opening, said shaft being adapted to receive a filterable substance through said entrance opening and direct said substance into said filter through said exit opening.

6. A rotary filter assembly according to claim 1 wherein said means for providing axial displacement includes means for moving said cutting member from said operable position in a direction towards the shorter end of said filter.

* * * * *